US010530164B2

(12) United States Patent
Ishikawa (10) Patent No.: US 10,530,164 B2
(45) Date of Patent: Jan. 7, 2020

(54) ELECTRIC STORAGE APPARATUS AND ELECTRIC-STORAGE CONTROLLING METHOD

(71) Applicant: FUJITSU TEN LIMITED, Kobe-shi, Hyogo (JP)

(72) Inventor: Yukio Ishikawa, Kobe (JP)

(73) Assignee: FUJITSU TEN Limited, Kobe-shi (JP)

( * ) Notice: Subject to any disclaimer, the term of this patent is extended or adjusted under 35 U.S.C. 154(b) by 0 days.

(21) Appl. No.: 15/797,951

(22) Filed: Oct. 30, 2017

(65) Prior Publication Data
US 2018/0212443 A1 Jul. 26, 2018

(30) Foreign Application Priority Data
Jan. 23, 2017 (JP) .................................. 2017-009391

(51) Int. Cl.
*H02J 7/00* (2006.01)
*H01M 10/42* (2006.01)

(52) U.S. Cl.
CPC .......... *H02J 7/0019* (2013.01); *H01M 10/42* (2013.01); *H01M 10/4207* (2013.01); *H01M 2010/4271* (2013.01); *H02J 7/0021* (2013.01)

(58) Field of Classification Search
CPC ...... H02J 7/0014; H02J 7/0026; H02J 7/0019; H02J 7/0021; G01R 31/3648; G01R 31/3658; H01M 10/42; H01M 10/4207; H01M 2010/4271
See application file for complete search history.

(56) References Cited

U.S. PATENT DOCUMENTS

2004/0160213 A1* 8/2004 Stanesti ............... H02J 7/0018
320/116
2012/0268070 A1 10/2012 Park et al.
2013/0127423 A1* 5/2013 Liang .................. H01M 10/443
320/136

(Continued)

FOREIGN PATENT DOCUMENTS

JP 2009-033936 A 2/2009
JP 2014-073051 A 4/2014
JP 2014-514692 A 6/2014

OTHER PUBLICATIONS

Nov. 27, 2018 Office Action issued in U.S. Appl. No. 15/797,680.
Jun. 13, 2019 Office Action issued in U.S. Appl. No. 15/797,680.

*Primary Examiner* — Nha T Nguyen
(74) *Attorney, Agent, or Firm* — Oliff PLC (57) ABSTRACT

An electric storage apparatus according to one aspect of an embodiment includes a plurality of storage batteries, a virtual processing unit, and a connection controlling unit. The virtual processing unit virtually and sequentially connects in parallel two or more storage batteries, of the plurality of storage batteries, having a potential difference or potential differences within a predetermined range so as to equalize electric potentials of the two or more storage batteries. The connection controlling unit connects in parallel the two or more storage batteries in a connection order for maximizing the number of the two or more storage batteries to be connected in parallel when the virtual processing unit sequentially connects in parallel the two or more storage batteries in an order from highest electric potential to lowest one and in an order from lowest electric potential to highest one.

5 Claims, 6 Drawing Sheets

(56) References Cited

U.S. PATENT DOCUMENTS

| | | | |
|---|---|---|---|
| 2013/0300370 A1* | 11/2013 | Hotta | H01M 10/425 320/117 |
| 2015/0194707 A1* | 7/2015 | Park | H01M 10/4207 429/50 |
| 2016/0084912 A1* | 3/2016 | Lee | G01R 31/362 324/426 |
| 2016/0094065 A1* | 3/2016 | Motoichi | H02J 7/0021 320/126 |

* cited by examiner

ELECTRIC STORAGE APPARATUS AND ELECTRIC-STORAGE CONTROLLING METHOD

CROSS-REFERENCE TO RELATED APPLICATION

This application is based upon and claims the benefit of priority of the prior Japanese Patent Application No. 2017-009391, filed on Jan. 23, 2017 the entire contents of which are incorporated herein by reference.

FIELD

The embodiment discussed herein is directed to an electric storage apparatus and an electric-storage controlling method.

BACKGROUND

Conventionally, there exists a battery apparatus that is obtained by connecting in parallel a plurality of storage batteries, each of which is includes a plurality of electric storage elements connected in serial to have the high voltage, so as to realize increase in capacity. In a case where the plurality of storage batteries is connected in parallel, when electric-storage states of the storage batteries are different from each other, there exists in this electric storage apparatus a risk that overcurrent flows from a storage battery having a high electric potential to a storage battery having a low electric potential, thereby leading to breakage.

Thus, there exists an electric storage apparatus in which storage batteries having small potential difference are connected in parallel when a plurality of storage batteries is to be connected in parallel and their electric potentials are equalized so as to suppress breakage caused by the above overcurrent (see Japanese Unexamined Patent Application Publication No. 2014-514692, for example).

However, in a conventional electric storage apparatus, there is not considered how to increase the number of parallel-connectable storage batteries when electric potentials of storage batteries are to be equalized.

SUMMARY

An electric storage apparatus according to one aspect of an embodiment includes a plurality of storage batteries, a virtual processing unit, and a connection controlling unit. The plurality of storage batteries is to be connected in parallel. The virtual processing unit virtually and sequentially connects in parallel two or more storage batteries, of the plurality of storage batteries, having a potential difference or potential differences within a predetermined range so as to equalize electric potentials of the two or more storage batteries. The connection controlling unit connects in parallel the two or more storage batteries in a connection order for maximizing the number of the two or more storage batteries to be connected in parallel when the virtual processing unit sequentially connects in parallel the two or more storage batteries in an order from highest electric potential to lowest one and the virtual processing unit sequentially connects in parallel the two or more storage batteries in an order from lowest electric potential to highest one.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIGS. 4A to 6 are diagrams illustrating parallel connection operations of packs that are to be performed by a control unit according to the embodiment.

DESCRIPTION OF EMBODIMENT

Figure 1A:
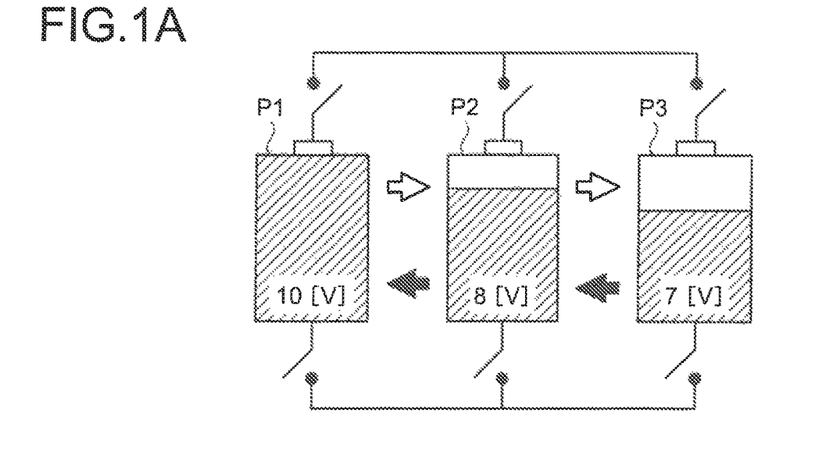
FIGS. 1A to 1C are diagrams illustrating an electric-storage controlling method according to an embodiment.
Figure 1B:
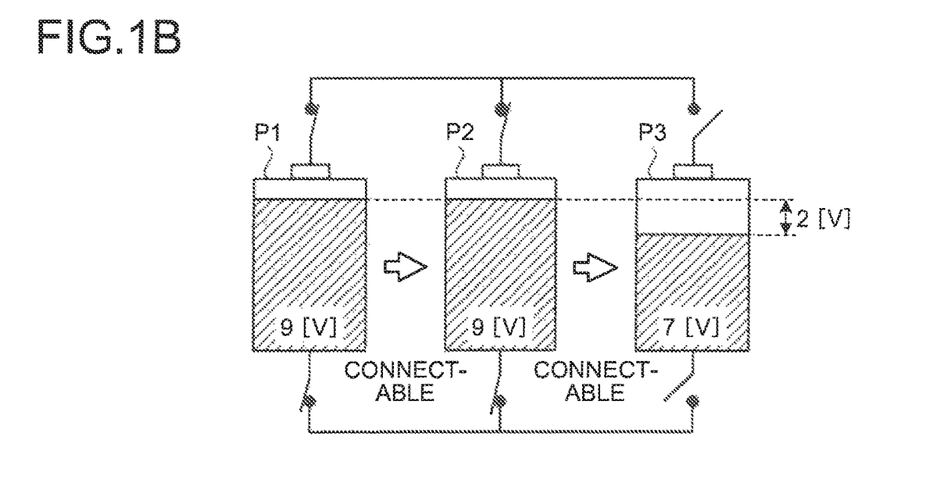
Figure 1C:
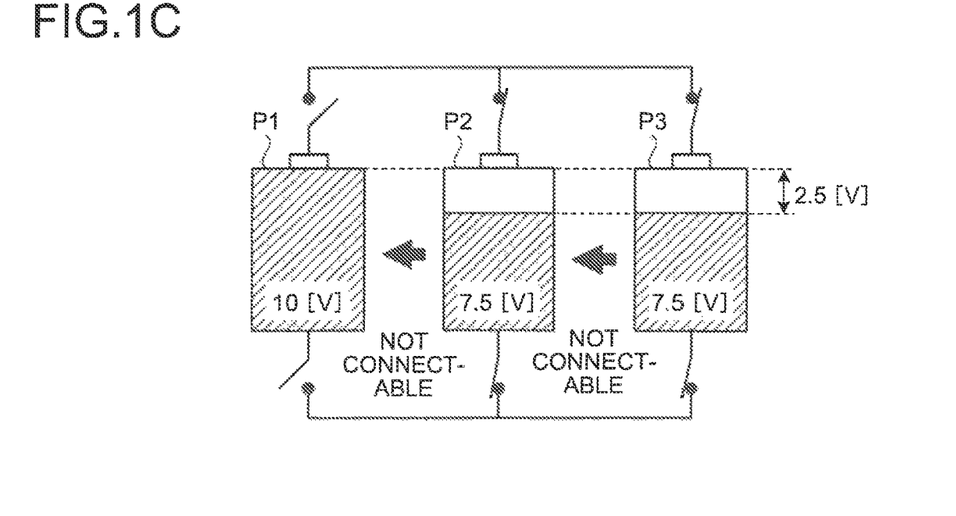

Hereinafter, an exemplary embodiment of an electric storage apparatus and an electric-storage controlling method disclosed in the present application will be described in detail with reference to the accompanying drawings. Moreover, it is not intended that the present disclosure be limited to the embodiment described below. First, the electric-storage controlling method according to the embodiment will be explained with reference to FIGS. 1A to 1C. FIGS. 1A to 1C are diagrams illustrating the electric-storage controlling method according to the embodiment.

In a case where a plurality of storage batteries (hereinafter, may be referred to as "packs") having different electric-storage states is to be connected in parallel, when a potential difference between the packs is large, there exists a fear that overcurrent flows from a pack having a high electric potential into a pack having a low electric potential to break a wire connecting the packs or the pack itself.

Thus, commonly, packs having small potential difference are connected in parallel with each other to equalize electric potentials of the packs, a pack having small potential difference from the equalized electric potential is further connected in parallel thereto to sequentially equalize electric potentials of the packs, whereby breakage of a wire connecting the packs or the pack itself is suppressed.

Note that, in a case where electric potentials of packs are to be equalized, when packs having small potential difference are simply sequentially connected in parallel with each other, even a connectable pack is not connected depending on a connection order in some cases.

Therefore, in the electric-storage controlling method according to the embodiment, before packs are actually connected in parallel, the packs are virtually connected in parallel in a plurality of safe connection orders in which overcurrent does not flow between the packs, so as to actually connect the packs in a connection order for increasing the number of parallel-connectable packs.

In this case, there exists a case where the number of safely parallel-connectable packs when packs are connected in the order from highest electric potential to lowest one is in some cases different from that when packs are connected in the order from lowest electric potential to highest one. Therefore, in the electric-storage controlling method according to the embodiment, packs are connected in parallel in a connection order for maximizing the number of safely parallel-connectable packs when packs are connected in the order from highest electric potential to lowest one and that when packs are connected in the order from lowest electric potential to highest one.

For example, as illustrated in FIG. 1A, it is assumed that there exist a pack P1 having the electric potential of 10 volts, a pack P2 having the electric potential of 8 volts, and a pack P3 having the electric potential of 7 volts. Description will be advanced under the assumption that overcurrent flows when a potential difference between packs to be connected in parallel exceeds 2 volts.

In this case, the number of connectable packs when packs are connected in the order from highest electric potential to lowest one is different from that when packs are connected in the order from lowest electric potential to highest one. Therefore, in the electric-storage controlling method according to the embodiment, a virtual process, as indicated by white arrows illustrated in FIG. 1A, for virtually and sequentially connecting packs in parallel in the order from highest electric potential to lowest one and a virtual process, as indicated by black arrows illustrated in FIG. 1A, for virtually and sequentially connecting packs in parallel in the order from lowest electric potential to highest one are first executed.

As illustrated in FIG. 1A, when packs are connected in parallel in the order from highest electric potential to lowest one, the electric potential of the pack P1 is 10 volts, the electric potential of the pack P2 is 8 volts, and thus a potential difference therebetween is 2 volts, whereby overcurrent does not flow even when the packs P1 and P2 are connected in parallel.

Thus, as illustrated in FIG. 1B, in the electric-storage controlling method according to the embodiment, the packs P1 and P2 are first connected in parallel. Whereby, the electric potentials of the packs P1 and P2 are equalized to be 9 volts.

In this case, the electric potential of the pack P3 to be next connected is 7 volts and a potential difference from the equalized electric potential of the packs P1 and P2 is 2 volts, and thus overcurrent does not flow when the pack P3 is connected in parallel with the packs P1 and P2. Thus, the pack P3 is able to be further connected in parallel. Therefore, when packs are virtually connected in parallel in the order from highest electric potential to lowest one, the number of parallel-connectable packs without overcurrent is three.

On the other hand, as illustrated in FIG. 1A, when packs are virtually connected in parallel in the order from lowest electric potential to highest one, the electric potential of the pack P3 is 7 volts, the electric potential of the pack P2 is 8 volts, and thus a potential difference therebetween is 1 volt, whereby overcurrent does not flow even when the packs P2 and P3 are connected in parallel.

Thus, in the electric-storage controlling method according to the embodiment, as illustrated in FIG. 1C, the packs P2 and P3 are first connected in parallel. Thus, the electric potentials of the packs P2 and P3 are equalized to be 7.5 volts.

In this case, the electric potential of the pack P1 to be next connected is 10 volts and a potential difference from the equalized electric potential of the packs P2 and P3 is 2.5 volts, and thus overcurrent is to flow when the packs P2 and P3 are connected in parallel. Thus, the pack P1 is not able to be further connected in parallel. Therefore, when packs are connected in parallel in the order from lowest electric potential to highest one, the number of parallel-connectable packs without overcurrent is two.

Thus, in the electric-storage controlling method according to the embodiment, when the three packs P1, P2, P3 are actually connected that are in a state illustrated in FIG. 1A, the pack P1, the pack P2, and the pack P3 are connected in parallel in the order from highest electric potential to lowest one, namely in this order, on the basis of this virtual processing result.

Thus, in the electric-storage controlling method according to the embodiment, it is possible to increase the number of safely parallel-connectable packs compared with the case where packs having small potential difference are simply sequentially connected in parallel when the electric potentials of storage batteries are to be equalized.

In a state illustrated in FIG. 1A, the number of parallel-connectable packs is larger when packs are sequentially connected in parallel in the order from highest electric potential to lowest one, there exists a case where the number of connectable packs is larger when packs are sequentially connected in parallel in the order from lowest electric potential to highest one depending on the electric potentials or potential differences of the packs.

In this case, the electric-storage controlling method according to the embodiment sequentially connects packs in parallel in the order from lowest electric potential to highest one to equalize the electric potentials of the packs so that the number of connectable packs is maximum. Note that, the electric-storage controlling method according to the embodiment may execute a virtual process for virtually connecting packs in parallel in the order from lowest electric potential to highest one, and then execute a virtual process for virtually connecting packs in parallel in the order from highest electric potential to lowest one.

Figure 2:
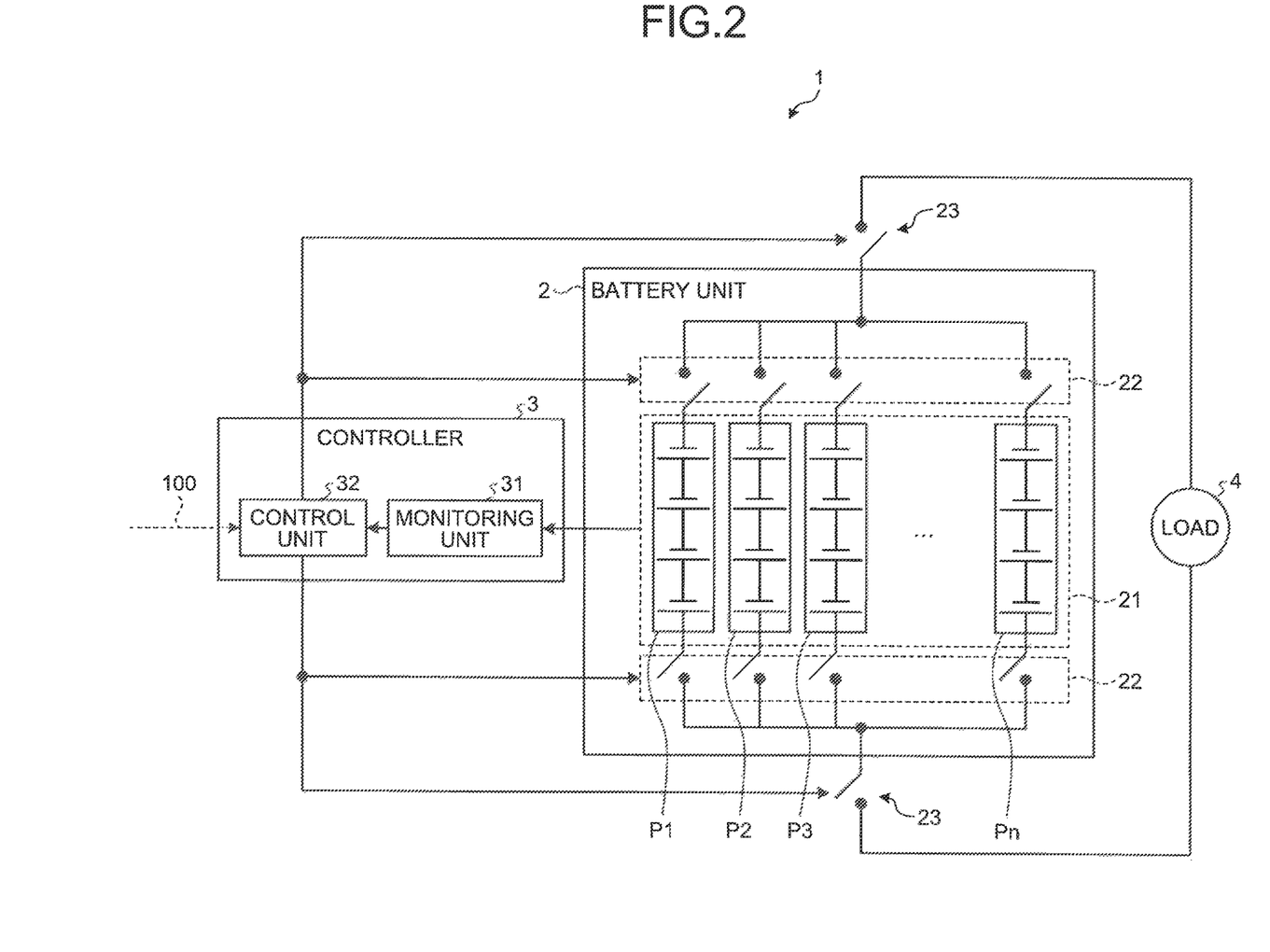
FIG. 2 is a diagram illustrating a configuration example of an electric storage apparatus according to the embodiment.

Next, a configuration example of an electric storage apparatus 1 according to the embodiment will be explained with reference to FIG. 2. FIG. 2 is a diagram illustrating a configuration example of the electric storage apparatus 1 according to the embodiment. A case will be explained as an example in which the electric storage apparatus 1 is provided in a hybrid automobile.

The electric storage apparatus 1 is discharged when supplying electric power to a load 4 such as a motor for driving a vehicle and another on-vehicle device, and is charged by drive energy of an engine or regenerative energy generated when the vehicle decelerates. The electric storage apparatus 1 may be applied to an arbitrary electric storage system including a secondary battery, such as an electric automobile and a Home Energy Management System (HEMS).

As illustrated in FIG. 2, the electric storage apparatus 1 includes a battery unit 2, a controller 3, and a main relay 23. The battery unit 2 includes an electric storage unit 21 in which the plurality of packs P1, P2, P3, . . . , Pn (n is natural number) is provided, and a sub-relay unit 22.

Herein, when an arbitrary pack among the plurality of packs P1, P2, P3, . . . , Pn is indicated, the pack is to be referred to as a pack P. Each of the packs P includes a plurality of serially-connected electric storage elements. The sub-relay unit 22 includes a plurality of sub-relays that is able to individually connect the plurality of packs P in parallel.

The controller 3 includes a monitoring unit 31 and a control unit 32. The monitoring unit 31 is realized by hardware such as an Application Specific Integrated Circuit (ASIC) and a Field Programmable Gate Array (FPGA). The monitoring unit 31 detects electric potentials of the packs P and outputs the detected result to the control unit 32.

The control unit 32 includes, for example, a Central Processing Unit (CPU), a Read Only Memory (ROM), a Random Access Memory (RAM), a microcomputer including an input/output port, and various circuits. A part or a whole of the control unit 32 may be constituted of hardware such as an ASIC and a FPGA.

The control unit 32 is a processing unit for performing ON/OFF control on the main relay 23 and for performing ON/OFF control on each of the sub-relays included in the sub-relay unit 22. When a startup signal 100 for starting charge or discharge by the battery unit 2 is input from the vehicle, this control unit 32 outputs a control signal to the sub-relay unit 22 to connect the parallel-connectable packs P with each other, and equalizes the electric potentials of the parallel connected packs P.

In this case, the control unit 32 selects a connection order by which the more packs P are able to be safely connected in parallel on the basis of the electric potentials of the packs P input from the monitoring unit 31, and outputs a control signal for connecting the packs P in parallel in the selected connection order to the sub-relay unit 22.

When equalization of the electric potentials of the parallel connected packs P is completed, the control unit 32 outputs a control signal to the main relay 23 to connect the battery unit 2 with the load 4, and starts charge or discharge of the battery unit 2.

Subsequently, when a termination signal for terminating charge or discharge of the battery unit 2 is input from the vehicle, the control unit 32 outputs a control signal to the main relay 23 so as to disconnect the battery unit 2 from the load 4.

Figure 3:
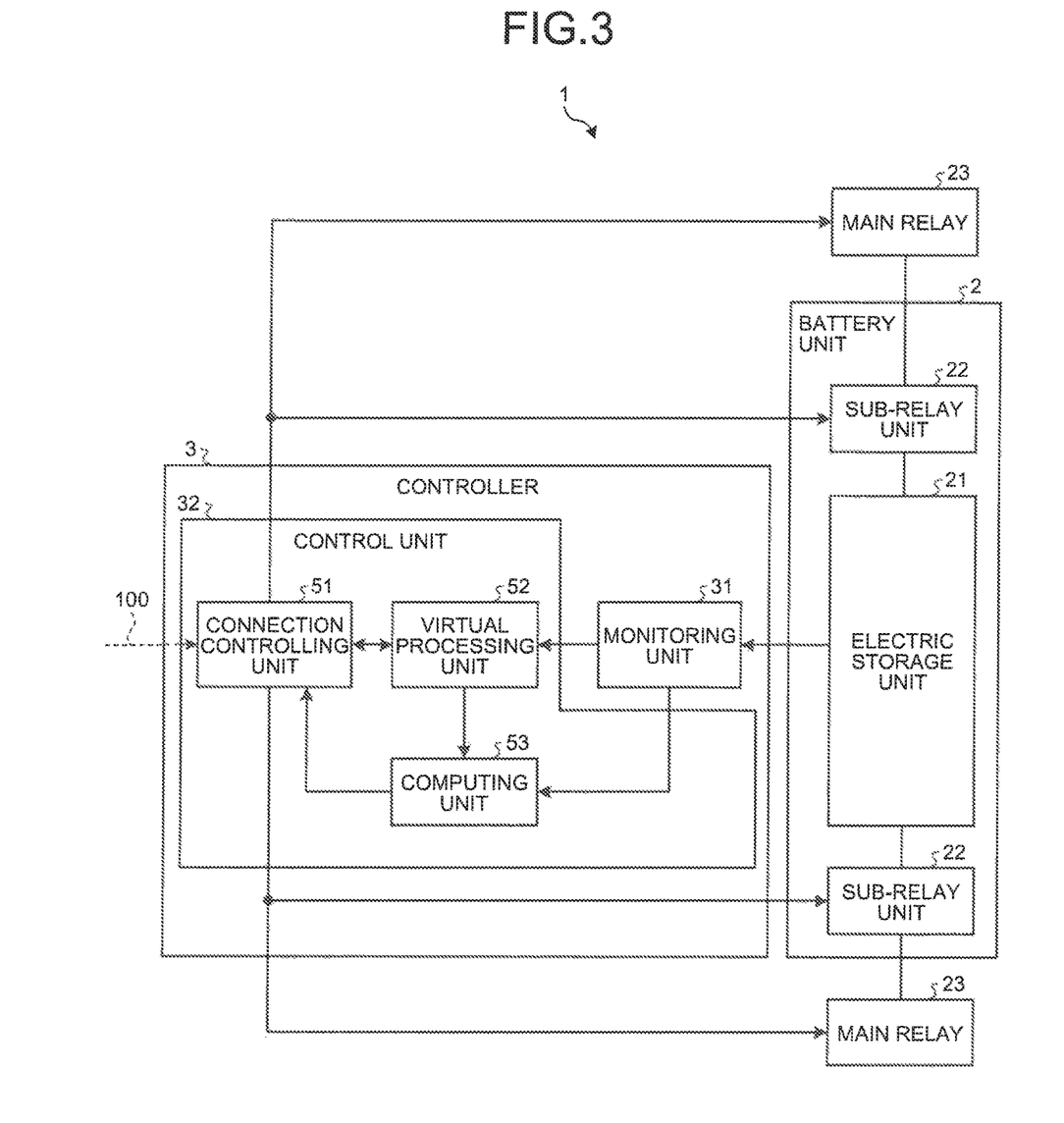
FIG. 3 is a functional block diagram illustrating the electric storage apparatus according to the embodiment.

Hereinafter, a configuration and operations of this control unit 32 will be more specifically explained with reference to FIGS. 3 to 6. FIG. 3 is a functional block diagram illustrating the electric storage apparatus 1 according to the embodiment. FIGS. 4A to 6 are diagrams illustrating parallel connection operations of the packs P that are to be performed by the control unit 32 according to the embodiment. Note that in the following, among the configuration elements illustrated in FIG. 3, configuration elements that are the same as the configuration elements illustrated in FIG. 2 are represented with same symbols and the description is omitted appropriately.

As illustrated in FIG. 3, the control unit 32 includes a connection controlling unit 51, a virtual processing unit 52, and a computing unit 53. The CPU uses the RAM as a work area to execute an electric-storage controlling program (not illustrated) stored in the ROM to function them.

The connection controlling unit 51 outputs a signal indicating the fact to the virtual processing unit 52 when the startup signal 100 is input. The virtual processing unit 52 acquires the electric potentials of the packs P from the monitoring unit 31 when a signal indicating the input of the startup signal 100 is input from the connection controlling unit 51.

When a potential difference between the pack P having the highest electric potential and that having the lowest electric potential is equal to or less than a predetermined threshold, overcurrent does not flow even when all of the packs P are connected in parallel to equalize the electric potentials. On the other hand, when the potential difference between the pack P having the highest electric potential and that having the lowest electric potential is more than the predetermined threshold, there exists a fear that overcurrent flows to break the battery unit 2 when all of the packs P are connected in parallel.

Thus, the virtual processing unit 52 determines whether or not the potential difference between the pack P having the highest electric potential and the pack P having the lowest electric potential is equal to or less than a predetermined threshold, when the potential difference is equal to or less than the threshold, outputs a signal indicating the fact to the connection controlling unit 51.

When a signal is input from the virtual processing unit 52, which indicates that the potential difference between the pack P having the highest electric potential and the pack P having the lowest electric potential is equal to or less than the predetermined threshold, the connection controlling unit 51 outputs, to the sub-relay unit 22, a control signal for sequentially turning ON the sub-relays.

In this case, a value of the synthesized resistance of the packs P is smaller as the number of the parallel-connected packs P is larger. Thus, the connection controlling unit 51 connects the packs P, in parallel, having a large potential difference with each other while the synthesized resistance is large so as to keep the amount of current that flows between the parallel connected packs P to be small, and reduces a damage to the battery unit 2 that is to be caused by the parallel connection of the packs P. In other words, the connection controlling unit 51 sequentially connects the packs P in parallel in the order from largest potential difference to smallest one.

Figure 4A:
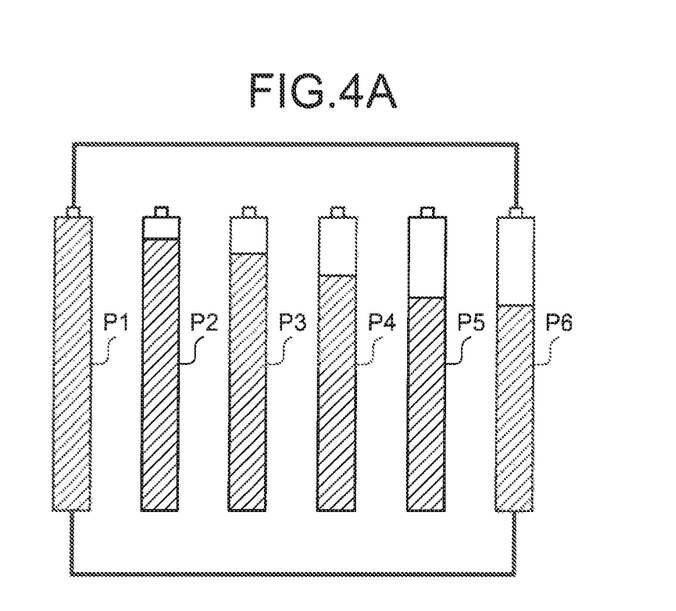

For example, as illustrated in FIG. 4A, when the electric storage unit 21 includes six packs of the pack P1 to P6, the connection controlling unit 51 first connects the pack P1, in parallel, having the highest electric potential to the pack P6 having the lowest electric potential. In this case, a potential difference between the pack P1 and the pack P6 is larger than that between the other packs of the pack P2 to P5, however the potential difference between the pack P1 and the pack P6 is equal to or less than a threshold, and thus no breakage occurs in the battery unit 2.

Figure 4B:
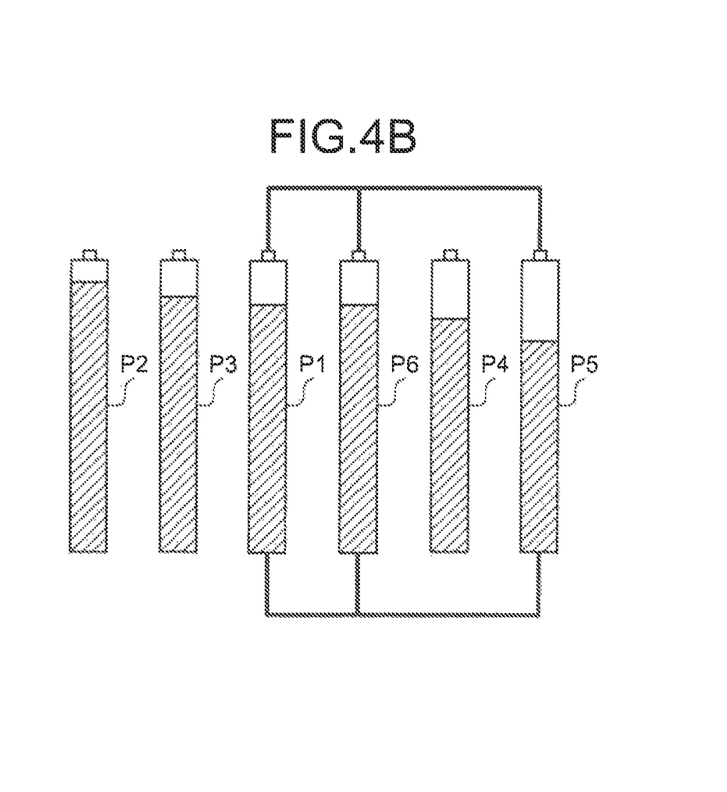

Next, as illustrated in FIG. 4B, when the electric potentials of the parallel-connected pack P1 and P6 are equalized, the connection controlling unit 51 further connects the pack P5, in parallel, having the largest potential difference from the equalized electric potential. Subsequently, the connection controlling unit 51 sequentially connects the packs P in parallel in the order from largest potential difference from the equalized electric potential to smallest one so as to equalize the electric potentials of all of the packs P.

Thus, the connection controlling unit 51 is able to reduce a damage to the battery unit 2 that is to be caused by parallel connection of the packs P. Subsequently, the connection controlling unit 51 acquires the electric potentials of the packs P from the monitoring unit 31 through the virtual processing unit 52, when the electric potentials of the packs P are equalized, determines that equalization of the electric potentials is completed so as to output, to the main relay 23, a control signal for turning ON the main relay 23.

When determining that the potential difference between the pack P having the highest electric potential and the pack P having the lowest electric potential is larger than the predetermined threshold, the virtual processing unit 52 executes a process for virtually connecting the packs P in parallel by a procedure similar to that having explained with reference to FIGS. 1A to 1C.

Specifically, when a potential difference between the pack P having the highest electric potential and that having the second highest electric potential is within a predetermined range, the virtual processing unit 52 first virtually connects this pair of the packs P in parallel and computes an equalized electric potential of the pair of the packs P.

Next, when a potential difference between the equalized electric potential and the next highest electric potential of the pack P is within a predetermined range, the virtual processing unit 52 repeats a process for further virtually connecting thereto this pack P in parallel so as to equalize the electric potentials.

When a potential difference between the equalized electric potential and the pack P having the next highest electric potential exceeds the predetermined range, the virtual processing unit 52 determines that the packs P having been virtually connected in parallel by then are the parallel-connectable packs.

Next, the virtual processing unit 52 repeatedly executes a process for sequentially virtually connecting the parallel-connectable packs P in parallel again in the order from highest electric potential to lowest one, from the pack P having the highest electric potential next to that finally determined to be parallel-connectable, namely, the pack P first determined not to be parallel-connectable so as to equalize the electric potentials.

The virtual processing unit 52 performs this virtual parallel connection up to the pack P having the lowest electric potential, derives a connection order of the packs P for maximizing the number of the parallel-connectable packs P, and outputs the derived connection order of the packs P to the connection controlling unit 51.

The virtual processing unit 52 repeatedly executes a process for sequentially virtually connecting the parallel-connectable packs P in parallel also in the order from lowest electric potential to highest one with respect to all of the packs P so as to equalize the electric potentials of the packs P. When the parallel-connectable packs P are sequentially virtually connected in parallel in the order from lowest electric potential to highest one, the virtual processing unit 52 derives a connection order of the packs P for maximizing the number of the parallel-connectable packs, and outputs the connection order to the connection controlling unit 51.

In this case, when the packs P are connected in the connection order for maximizing the number of the parallel-connectable packs, there exists, in some cases, a case where a connection time interval to be spent until the electric potentials of the packs P are equalized exceeds a startup time interval of the battery unit 2. This startup time interval is a predetermined time interval from an input of the startup signal 100 to the control unit 32 to turning ON of the main relay 23.

The virtual processing unit 52 outputs, to the computing unit 53, the connection order of the packs P for maximizing the number of the parallel-connectable packs P. When the packs P are virtually connected in parallel in the connection order that is input from the virtual processing unit 52, the computing unit 53 computes a time interval until the electric potentials of the packs P are equalized on the basis of the electric potentials of the packs P that are input from the monitoring unit 31. The computing unit 53 outputs the computed time interval to the connection controlling unit 51.

When the time interval input from the computing unit 53 exceeds the startup time interval of the battery unit 2, the connection controlling unit 51 reduces the number of the packs P to be connected in parallel so that a time interval for the equalization is within the startup time interval of the battery unit 2. Thus, the connection controlling unit 51 is able to safely connect in parallel more of the parallel-connectable packs P without delaying a start of the battery unit 2.

Figure 5:
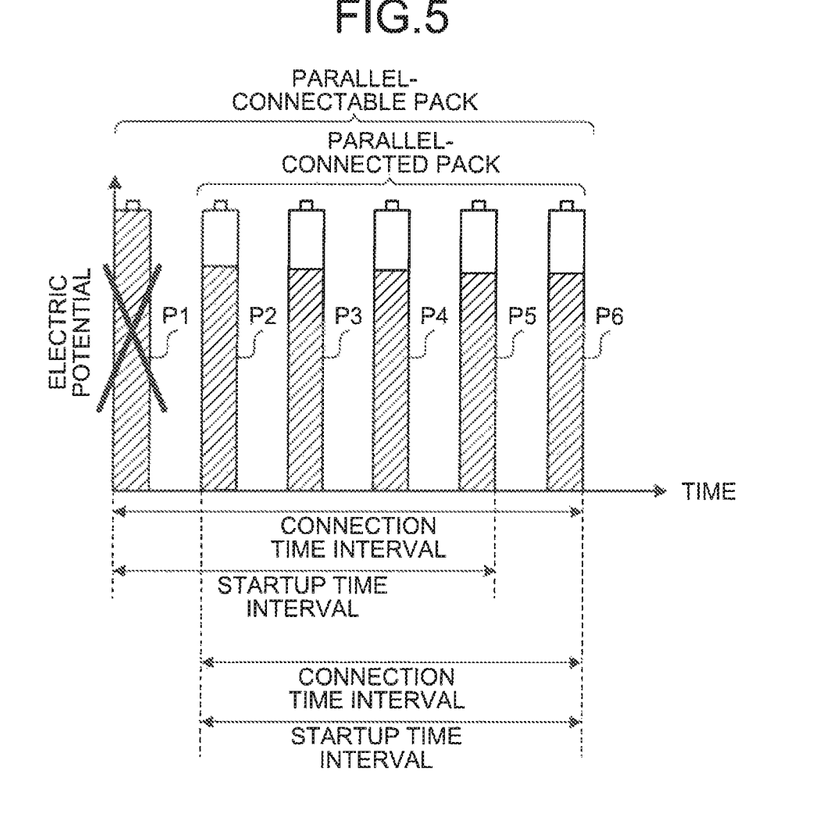

For example, as illustrated in FIG. 5, when six packs of the packs P1 to P6 are parallel-connectable, there exists, in some cases, a case where a connection time interval from parallel connection of the six packs P1 to P6 to equalization of the electric potentials of the packs P1 to P6 exceeds the startup time interval of the battery unit 2.

In this case, the connection controlling unit 51 excepts, among from the six pack P1 to P6 and from targets to be connected in parallel, the pack P1 having a maximum potential difference from the average electric potential of the packs P1 to P6. In a case where five packs of the pack P2 to P6 are connected in parallel, when a time interval until the electric potentials of the packs P are equalized does not exceed the startup time interval of the battery unit 2, the connection controlling unit 51 determines the five packs P2 to P6 to be packs to be connected in parallel.

In a case where the five packs P2 to P6 are connected in parallel, when a time interval until the electric potentials of the packs P are equalized exceeds the startup time interval of the battery unit 2, the connection controlling unit 51 further excepts, from the targets to be connected in parallel, the pack P having a maximum potential difference from the average electric potential.

In this manner, the connection controlling unit 51 excepts, from targets to be connected in parallel, the pack P having a maximum potential difference from an average electric potential, namely, the pack P having a longer time interval for equalization than the other pack P. Thus, it is possible to safely connect in parallel more of the parallel-connectable packs P while minimizing the number of the packs P to be excepted from targets of parallel connection and without delaying a start of the battery unit 2.

When a time interval that is input from the computing unit 53 does not exceed the startup time interval of the battery unit 2, the connection controlling unit 51 determines all of the packs P whose connection order is input from the virtual processing unit 52 to be the parallel-connection packs.

The connection controlling unit 51 compares the maximum number of the parallel-connectable packs P when the packs P are virtually connected in parallel in the order from highest electric potential to lowest one with that in the order from lowest electric potential to highest one, and selects the connection order having the larger number of the packs.

In this case, there exists, in some cases, a case where the maximum number of the parallel-connectable packs P when the packs P are virtually connected in parallel in the order from highest electric potential to lowest one is the same as that in the order from lowest electric potential to highest one.

Figure 6:
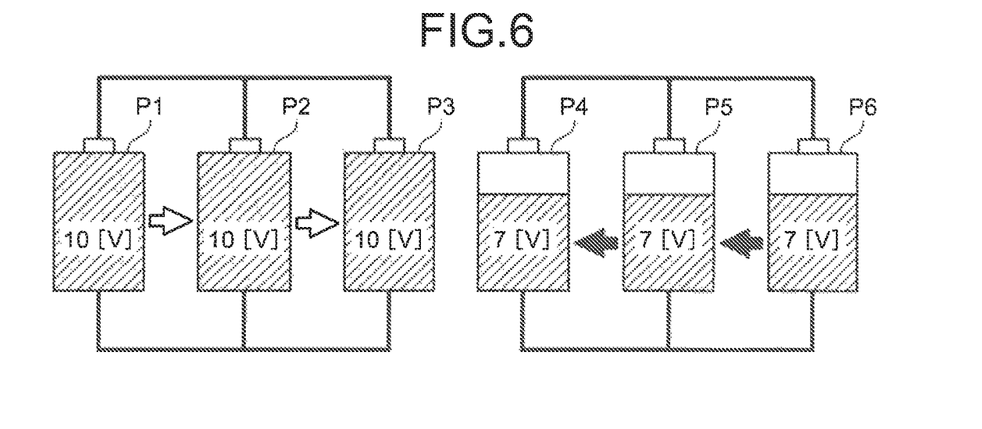

For example, as illustrated in FIG. 6, there exists, in some cases, a case where parallel-connection packs that are to be connected in parallel in the order from highest electric potential to lowest one are the packs P1, P2, P3, and parallel-connection packs that are to be connected in parallel in the order from lowest electric potential to highest one are the packs P6, P5, P4.

In this case, the connection controlling unit 51 determines the packs P1, P2, P3 having the higher equalized electric potential to be parallel-connection packs, and selects a connection order of the pack P1, P2, P3 that is input from the virtual processing unit 52. Thus, the connection controlling unit 51 is able to select the connection order of the packs P1, P2, P3 that is able to supply sufficient electric power to the load 4.

The connection controlling unit 51 outputs to the sub-relay unit 22 a control signal for actually connecting the packs P in parallel in the selected connection order. Thus, when the electric potentials of the packs P are equalized, the connection controlling unit 51 is able to increase the number of the parallel-connectable packs P while preventing over-current from flowing into the battery unit 2.

Specifically, when equalization of the electric potentials of the parallel-connected packs P is completed, the connection controlling unit 51 outputs, to the main relay 23, a control signal for turning ON the main relay 23 to connect the battery unit 2 with the load 4.

Figure 7:
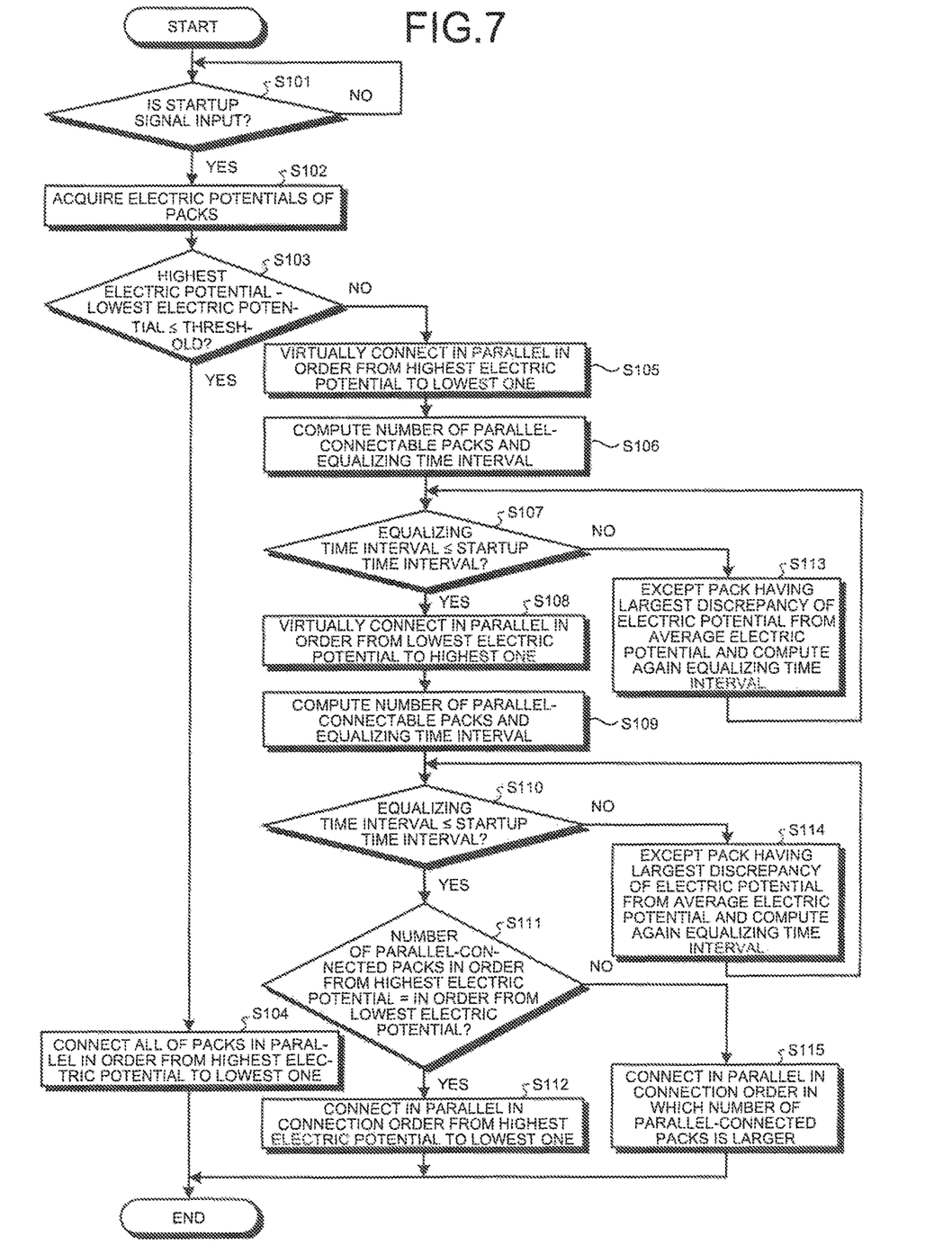
FIG. 7 is a flowchart illustrating a procedure for processes to be executed by the controller of the electric storage apparatus according to the embodiment.

Next, processes to be executed by the controller 3 of the electric storage apparatus 1 will be explained with reference to FIG. 7. FIG. 7 is a flowchart illustrating a procedure for processes to be executed by the controller 3 of the electric storage apparatus 1 according to the embodiment. In FIG. 7, the process are illustrated from a process for inputting the startup signal 100 to that for connecting the parallel-connectable packs P in parallel, which are performed by the controller 3.

As illustrated in FIG. 7, the controller 3 first determines whether or not the startup signal 100 is input (Step S101). When determining that the startup signal 100 is not input (Step S101: No), the controller 3 repeatedly executes the determination process of Step S101 until the startup signal 100 is input.

When determining that the startup signal 100 is input (Step S101: Yes), the controller 3 acquires the electric potentials of the packs P (Step S102). Specifically, the controller 3 determines whether or not a value, which is obtained by subtracting the lowest electric potential from the highest electric potential of the electric potentials of the packs P, is equal to or less than a threshold (Step S103).

When the value, which is obtained by subtracting the lowest electric potential from the highest electric potential, is determined to be equal to or less than the threshold (Step S103: Yes), the controller 3 connects all of the packs P in parallel in the order from highest electric potential to lowest one (Step S104), and terminates the process. When the electric potentials of the parallel-connected packs P are equalized, the controller 3 turns ON the main relay 23 (not illustrated).

When the value, which is obtained by subtracting the lowest electric potential from the highest electric potential, is determined to be more than the threshold (Step S103: No), the controller 3 virtually connects the parallel-connectable packs P in parallel in the order from highest electric potential to lowest one (Step S105). Next, the controller 3 computes the number of parallel-connectable packs and an equalizing time interval (Step S106). The above equalizing time interval is a time interval from parallel connection of the packs P that are determined to be parallel-connectable to the equalization of the electric potentials of the packs P.

Next, the controller 3 determines whether or not the equalizing time interval is less than a startup time interval of the battery unit 2 (Step S107). When determining that the equalizing time interval is equal to or more than the startup time interval (Step S107: No), the controller 3 excepts, from the parallel-connectable packs, the pack P having the largest discrepancy of the electric potential from the average electric potential, and computes again an equalizing time interval (Step S113), and shifts the process to Step S107. In this case, the controller 3 subtracts one from the number of the parallel-connectable packs that is computed in Step S106.

When determining that the equalizing time interval is less than the startup time interval (Step S107: Yes), the controller 3 virtually connects the parallel-connectable packs P in parallel in the order from lowest electric potential to highest one (Step S108). Next, the controller 3 computes the number of the parallel-connectable packs and the equalizing time interval (Step S109).

Next, the controller 3 determines whether or not the equalizing time interval is less than the startup time interval of the battery unit 2 (Step S110). When determining that the equalizing time interval is equal to or more than the startup time interval (Step S110: No), the controller 3 excepts, from the parallel-connectable packs, the pack P having the largest discrepancy of the electric potential from the average electric potential, computes again an equalizing time interval (Step S114), and shifts the process to Step S110. In this case, the controller 3 subtracts one from the number of the parallel-connectable packs that is computed in Step S109.

When determining that the equalizing time interval is less than the startup time interval (Step S110: Yes), the controller 3 shifts the process to Step S111. In the process of Step S111, the controller 3 determines whether or not the number of the parallel-connected packs when the packs are virtually connected in parallel in the order from highest electric potential to lowest one is equal to that when the packs are virtually connected in parallel in the order from lowest electric potential to highest one (Step S111).

When determining that the number of the parallel-connected packs when the packs are virtually connected in parallel in the order from highest electric potential to lowest one is equal to that when the packs are virtually connected in parallel in the order from lowest electric potential to highest one (Step S111: Yes), the controller 3 connects the packs P in parallel in the connection order from highest electric potential to lowest one (Step S112), and terminates the process.

When determining that the number of the parallel-connected packs when the packs are virtually connect in parallel in the order from highest electric potential to lowest one is not equal to that when the packs are virtually connected in parallel in the order from lowest electric potential to highest one (Step S111: No), the controller 3 connects the pack P in parallel in a connection order in which the number of the parallel-connected packs is larger (Step S115), and terminates the process. When the electric potentials of the parallel connected packs P are equalized, the controller 3 turns ON the main relay 23 (not illustrated).

As described above, the electric storage apparatus 1 according to the embodiment includes the plurality of packs P, the virtual processing unit 52, and the connection controlling unit 51. The plurality of packs P is to be connected in parallel. The virtual processing unit 52 virtually and sequentially connects in parallel the two or more storage packs P, of the packs P, having a potential difference or potential differences within a predetermined range so as to equalize the electric potentials of the two or more storage packs P.

The connection controlling unit 51 connects in parallel the two or more storage packs P in a connection order for maximizing the number of the two or more storage packs P to be connected in parallel when the virtual processing unit 52 virtually and sequentially connects in parallel the two or more storage packs P in an order from highest electric potential to lowest one and the virtual processing unit 52 virtually and sequentially connects in parallel the two or more storage packs P in an order from lowest electric potential to highest one. Thus, when equalizing the electric potentials of the packs P, the electric storage apparatus 1 is able to increase the number of the parallel-connectable packs P while preventing overcurrent from flowing.

In the above embodiment, the case is exemplified in which the startup signal 100 is input to the electric storage apparatus 1, and then the packs P are equalized. The electric storage apparatus 1 may equalize the pack P when a control signal is input, which is to terminate charge or discharge performed by the battery unit 2.

In this case, the controller 3 is not to consider the startup time interval of the battery unit 2, so that it is possible to connect in parallel the maximum number of the packs P to be connected in parallel without overcurrent to equalize the electric potentials of the packs P. Thus, by employing the electric storage apparatus 1, it is possible to increase the number of the packs P to be connected in parallel when the electric potentials of the packs P are equalized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric storage apparatus comprising:
   at least three storage batteries to be connected in parallel; and
   a processor programmed to:
      virtually and sequentially connect in parallel, among the at least three storage batteries, three or more storage batteries having potential differences within a predetermined range by excluding one or more batteries having potential differences outside the predetermined range, so as to equalize electric potentials of the three or more storage batteries, in an order from a highest electric potential to a lowest electric potential to derive a first number of the three or more storage batteries connectable in parallel;
      virtually and sequentially connect in parallel, among the at least three storage batteries, three or more storage batteries having potential differences within the predetermined range by excluding one or more batteries having potential differences outside the predetermined range, so as to equalize electric potentials of the three or more storage batteries, in an order from the lowest electric potential to the highest electric potential to derive a second number of the three or more storage batteries connectable in parallel;
      compare the first number and the second number to derive a connection order that corresponds to a greater one of the first number and the second number; and
      connect in parallel the three or more storage batteries in the derived connection order.

2. The electric storage apparatus according to claim 1, wherein
   the processor is further programmed to:
      connect in parallel the three or more storage batteries within a predetermined startup time interval of a battery unit including the three or more storage batteries.

3. The electric storage apparatus according to claim 2, wherein
   the processor is further programmed to:
      compute a time interval for equalizing the electric potentials of the three or more storage batteries that are virtually connected in parallel in the derived connection order; and
      when the computed time interval exceeds the startup time interval, exclude a storage battery having a maximum potential difference from an average electric potential of the three or more storage batteries that are virtually connected in parallel, from the three or more storage batteries.

4. The electric storage apparatus according to claim 1, wherein
   the processor is further programmed to:
      when a plurality of connection orders that correspond to a greater one of the first number and the second number are derived, connect in parallel the three or more storage batteries in a connection order that maximizes an equalized electric potential among the derived plurality of connection orders.

5. An electric-storage controlling method performed by a processor, the method comprising:
   virtually and sequentially connecting in parallel, among at least three storage batteries to be connected in parallel, three or more storage batteries having potential differences within a predetermined range by excluding one or more batteries having potential differences outside the predetermined range, so as to equalize electric potentials of the three or more storage batteries, in an order from a highest electric potential to a lowest electric potential to derive a first number of the three or more storage batteries connectable in parallel;
   virtually and sequentially connecting in parallel, among the at least three storage batteries, three or more storage batteries having potential differences within the predetermined range by excluding one or more batteries having potential differences outside the predetermined range, so as to equalize electric potentials of the three or more storage batteries, in an order from the lowest electric potential to the highest electric potential to derive a second number of the three or more storage batteries connectable in parallel;
   comparing the first number and the second number to derive a connection order that corresponds to a greater one of the first number and the second number; and
   connecting in parallel the three or more storage batteries in the derived connection order.

* * * * *